Patented Feb. 15, 1927.

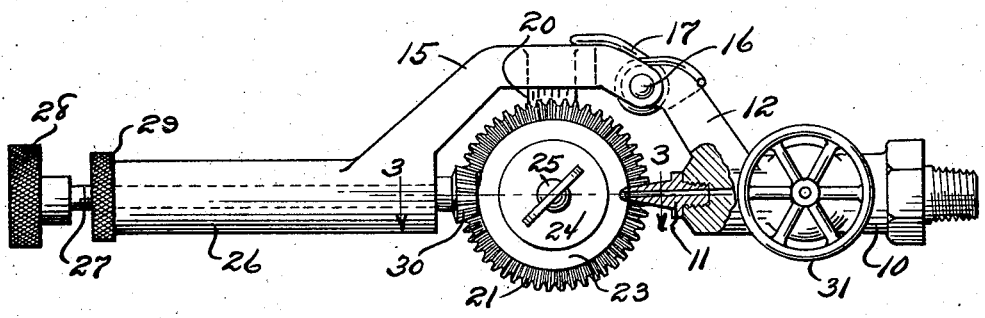

1,618,119

UNITED STATES PATENT OFFICE.

HENRY E. WALLING, OF ELECTRA, TEXAS.

GAUGE COCK.

Application filed August 20, 1926. Serial No. 130,483.

This invention contemplates the provision of a gauge or test cock for steam boilers and the like, wherein the discharge nipple is normally closed by a packing carried by a spring pressed pivoted lever, and which packing can be very easily and conveniently rotated from time to time to present a new surface to the nipple as the occasion may require, the invention residing in the construction, combination and arrangement of parts as claimed.

In the drawing forming part of this application like numerals of reference indicate similar parts in the several views and wherein:

Figure 1 is a side elevation of the invention.

Figure 2 is a top plan view.

Figure 3 is a sectional view on line 3—3 of Figure 1.

Referring to the drawing in detail 10 indicates the usual nipple or body of the gauge which is adapted to be screw-threaded into the boiler, not shown, and which gauge is provided with a discharge port, which in this specific instance is preferably in the nature of a discharge nipple 11 which is threaded or otherwise suitably associated with one end of the gauge 10 as shown in Figure 1. Projecting from the body of the gauge is a bracket arm 12 having spaced lugs 13 which are straddled by the separated portions 14 defined by the bifurcated extremity of a lever 15, the latter being pivoted upon the lugs 13 by the pivoted bolt 16 as clearly shown in Figure 2. Surrounding this bolt is a coil spring 17, one end 18 of which bears against the bracket arm 12 while the other end 19 of which bears against the lever 15 for the purpose of normally closing the discharge nipple 11 in a manner to be hereinafter described. The lever 15 is provided with a depending arm 20 upon which a ring gear 21 is rotatably mounted and which gear includes a solid hub-like portion 22 upon which a circular packing 23 is mounted as clearly shown in Figure 3. This packing is held positioned upon the hub by means of a disk 24 having a slightly greater diameter than the hub-like portion 22, the disk being held associated with the hub by means of a thumb bolt 25, thereby holding the packing between the disk 24 and the ring gear 21. It will be noted upon inspection of Figure 1 that that portion of the lever 15 which is connected with the bracket arm 12, defines with the latter a substantially arch-shaped portion beneath which the ring gear is arranged, so that the packing 23 is positioned to engage and normally close the discharge nipple 11. The lever 15 further includes a hollow handle-like portion 26 in which a shaft 27 is journaled, the shaft projecting beyond the outer end of the handle and threaded for a portion of its length to accommodate a knob 28 through the instrumentality of which the shaft 27 is rotated, and a lock nut 29 for holding the shaft in a given position. Carried by the inner end of this shaft is a pinion 30 meshing with the ring gear 21, so that by rotating the shaft 27. similar motion is imparted to the gear 21 for the purpose of presenting a new surface or portion of the packing 23 to the discharge nipple 11 as the occasion may require. In this manner the entire peripheral surface of the packing may be used before replacing the same, but when this is necessary it can be easily changed by removing the disk 24 and slipping the packing off the hub-like portion 22 of the ring gear.

The gauge proper indicated at 10 is also provided with a valve of any well known construction, the manipulating wheel for which is indicated at 31, so that this valve can be closed while the packing 23, or the discharge nipple 11 is being replaced.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In combination, a gauge cock having a discharge port, a lever pivotally mounted thereon, a ring gear journaled on said lever and depending therefrom, a circular packing carried by said gear and having its periphery normally closing said port, and means carried by the lever for rotating said gear and packing to present a new peripheral surface to said port when desired.

2. In combination, a gauge cock having a discharge port, a spring pressed lever pivoted on said gauge and including a hollow handle portion, a ring gear journaled on said lever, a circular packing carried by said gear and normally closing said port, a shaft journaled in said handle-like portion, a pinion carried by the shaft and meshing with said gear, and means for rotating said shaft to operate said gear and present a new surface of the packing to said port.

3. In combination, a gauge cock having a discharge port, a spring pressed pivoted lever mounted on said gauge and including a handle portion normally arranged in axial alignment with said port, a ring gear journaled on said lever and including a hub-like portion, a circular packing mounted on said hub-like portion, a removable disk carried by said portion for holding the packing therebetween and said gear, said packing normally closing said port, a shaft journaled in said handle portion of the lever, a pinion carried by said shaft and meshing with said gear, and means for rotating said shaft to operate said gear, and thereby present a new surface of the packing to said port.

In testimony whereof I affix my signature.

HENRY E. WALLING.